United States Patent [19]

Allen

[11] 4,208,177
[45] Jun. 17, 1980

[54] FLUID COOLING OF INJECTION MOLDED PLASTIC ARTICLES

[75] Inventor: Paul E. Allen, Newtown, Conn.

[73] Assignee: Logic Devices, Inc., Bethel, Conn.

[21] Appl. No.: 37,979

[22] Filed: May 11, 1979

Related U.S. Application Data

[62] Division of Ser. No. 860,370, Dec. 14, 1977.

[51] Int. Cl.$^2$ .................... B29C 1/02; B29F 1/022
[52] U.S. Cl. .................... 425/404; 425/546; 425/552; 425/446; 425/DIG. 9; 425/DIG. 60; 425/812
[58] Field of Search ............... 425/DIG. 60, DIG. 9, 425/404, 446, 547, 552, 812, 407, 548, 546, 4 R, 817 R; 264/45.5; 249/79

[56] References Cited

U.S. PATENT DOCUMENTS

| | | | |
|---|---|---|---|
| 3,156,015 | 11/1964 | Harrison | 264/51 |
| 3,225,126 | 12/1965 | Bridges et al. | 264/51 |
| 3,505,435 | 4/1970 | Schmidt | 264/DIG. 83 |
| 3,619,438 | 11/1971 | Cistone | 264/53 |
| 3,671,168 | 6/1972 | Nussbaum | 264/DIG. 83 |
| 3,704,081 | 11/1972 | Immel | 425/812 |
| 3,941,528 | 3/1976 | Cotterell | 425/812 |
| 4,139,177 | 2/1979 | Hanning | 264/DIG. 83 |
| 4,164,523 | 8/1979 | Hanning | 264/DIG. 83 |

*Primary Examiner*—W. E. Hoag
*Attorney, Agent, or Firm*—Thomas L. Tully

[57] ABSTRACT

A method and system for cooling an injection molded plastic article by forming a portion of a mold cavity of fluid permeable porous material that communicates with a cooling liquid passageway and subjecting the cooling liquid to different pressures to vary the flow of fluid through the porous plug.

4 Claims, 4 Drawing Figures

FLUID COOLING OF INJECTION MOLDED PLASTIC ARTICLES

This is a division of application Ser. No. 860,370, filed Dec. 14, 1977.

The present invention relates to the art of injection plastic molding as does my co-pending application, Ser. No. 769,488, filed Feb. 17, 1977 and entitled Method and Apparatus for Venting Entrapped Air in Mold Cavities, wherein hot plastic material is forced under pressure into a mold cavity that has the shape of the desired finished article and which is formed in separable mold dies. After injection, the plastic material must be cooled to harden before it may be removed from the mold cavity. Heretofore accepted techniques for cooling have involved the forming of cooling liquid passageways in the mold dies adjacent the cavity and the forcing of cooling liquid through the passageways. The plastic material thus adds heat to the mold die while the cooling liquid removes heat. However, the cooling liquid has been maintained separated from the mold cavity so that the transfer of heat between the plastic article and the cooling liquid requires the heat to pass through the portion of the mold die therebetween. These portions accordingly may act to limit the heat transferred and hence increase the duration of the molding cycle.

It is accordingly an object of the present invention to provide a method and apparatus for cooling injection molded plastic material which tends to decrease the duration of the molding cycle by permitting cooling fluid to contact directly the plastic material when it is in the mold cavity.

Another object of the present invention is to achieve the above object by enhancing the ability of the cooling liquid to remove heat from the mold dies by enabling the cooling liquid to vaporize to thereby absorb its heat of vaporization from the mold dies.

A further object of the present invention is to achieve the above objects with a method and system that is easily and economically incorporated into new and existing mold dies and which is readily adaptable to existing molding apparatus.

In carrying out the present invention, there is provided the usual pair of separable mold dies which when closed define a mold cavity into which plastic material is injected. Further, as is customary, cooling passageways are formed in the dies adjacent the surfaces of the mold cavity for conducting cooling liquid. The liquid absorbs the heat from the injected plastic material enabling the same to harden so that it may be removed from the cavity when the mold dies are opened.

To the above structure of typical mold dies, the present invention removes some of the solid metal of which the dies are formed that is between a portion of the mold cavity and an adjacent cooling passageway and positions in this space, an insert which is formed of porous metallic material that is permeable to the liquid coolant. For most of the time, the coolant in the cooling passageway is caused to flow at a less than atmospheric pressure which may be achieved by connection thereof to a negative pressure system as disclosed in my copending application, Ser. No. 733,812, filed Oct. 19, 1976 and entitled Cooling System for Plastic Molds. However, the system is altered to enable varying of the pressure of the coolant to be at times greater than atmospheric and/or at other times, more negative than usual.

By varying the coolant pressure, the direction of flow of coolant and/or air into and through the porous plug may be controlled. Thus for example, after sufficient plastic material has been injected to cause the material to completely cover the surface of the porous insert and form a hardened skin, the cooling fluid may be shifted to have a greater than atmospheric pressure exist in the coolant passageway. The positive pressure forces liquid coolant into the porous insert where it is capable of contacting the hardened skin of the plastic article and heat is thus transferred directly from the plastic material to the coolant without damage to the surface of the plastic material. This quickens the heat transfer between the plastic material and the coolant since heat does not have to be transferred through portions of the dies.

Prior to opening the mold dies to remove the hardened article, the positive pressure is removed and the negative pressure again applied. When this occurs, the coolant in the porous insert passageway, by being placed at a less than atmospheric pressure will increase its tendency to vaporize and as it does, is absorbs the heat needed for vaporization from the plastic material and the adjacent mold portions. Further, if desired, a more negative pressure may be applied for a short duration to enhance the vaporization. Accordingly, by providing a porous plug against which cooling liquid is placed at different pressures, the cooling of the plastic material is caused to occur quicker than without the present invention thereby producing the articles more efficiently and economically by decreasing the required cycle time.

Other features and advantages will hereinafter appear.

Figure 1:
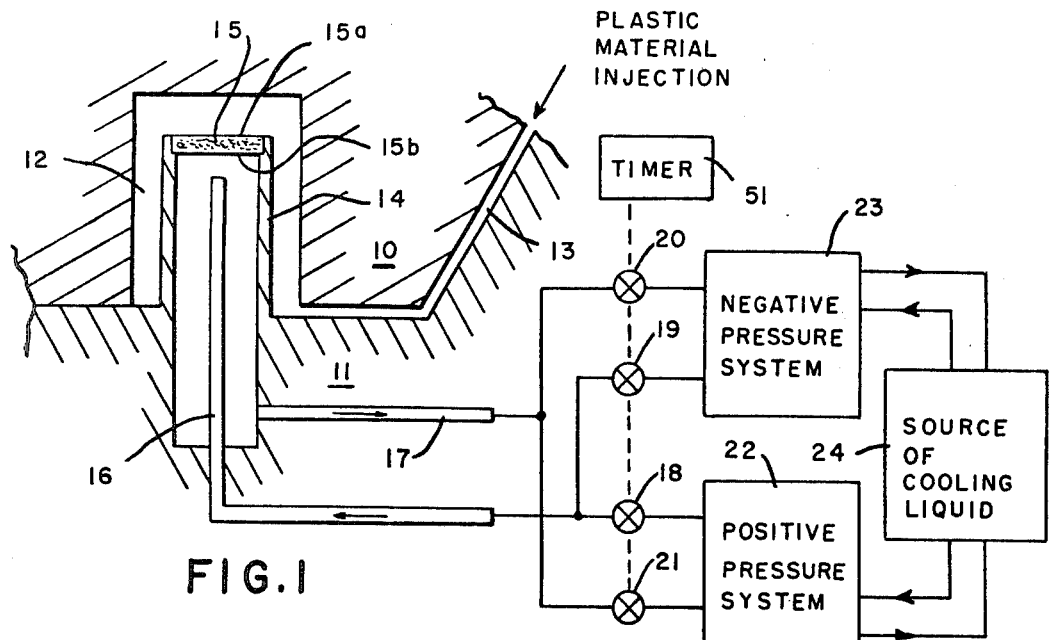
FIG. 1 is a diagrammatic representation of the present invention.

Referring to the drawing, the present invention is shown applied to a pair of injection mold dies 10 and 11 which, as shown, are closed to define a mold cavity 12 into which plastic material may be forced through a sprue 13. The die 11 in the particular embodiment shown has a hollow core 14 with its end being formed by a porous metal plug or insert 15 which is otherwise secured to the core in any desired manner. One material from which the insert may be formed is sintered stainless steel having pores which are as large as possible but yet which are small enough so that the plastic material will not enter and plug the pores, with sizes being typically on the order of 0.0005 to 0.004 inch in diameter.

Positioned within the core 14 is a coolant inlet pipe 16 while a coolant outlet pipe 17 communicates with the hollow core, the hollow core accordingly constitutes a coolant passageway adjacent the mold cavity. The pipe 16 communicates with a first valve 18 and another valve 19 while the outlet pipe is also connected to a pair of valves 20 and 21. The valves 18 and 21, as shown, are connected to a positive, i.e. greater than atmospheric pressure system 22 while the valves 19 and 20 are connected to a negative, less than atmospheric, pressure system 23 with both systems being connected to a source of cooling liquid 24.

By opening only the valves 19 and 20, the coolant passageway and the inlet and outlet pipes 16 and 17 become connected to the negative pressure system to produce within the core 14, a flow of coolant liquid at a less than atmospheric pressure. On the other hand, by having the valves 18 and 21 open, with the valves 19 and 20 closed, coolant flows through the passageway in the core 14 but at a higher than atmospheric pressure as for example on the order of 5 psi.

In the operation of such a system, the valves 19 and 20 are open to maintain a negative pressure within the coolant passageway until the dies 10 and 11 are closed and sufficient plastic material has been injected through the sprue 13 to at least completely cover the mold cavity surface 15a of the porous insert. The surface of the plastic material that engages the porous insert immediately hardens to form a thin skin over the porous insert. The negative pressure assures that coolant will not contact the hardened plastic material. The valves 18 and 21 are then opened, and the valves 19 and 20 closed and the coolant, under pressure, engages the passageway surface 15b of the porous insert and enters into its pores to be present on the surface 15a and engage the skin surface of the plastic material. Heat is then directly transferred to the cooling liquid. The coolant is generally water which does not effect the hardened plastic material that forms the skin.

Prior to the mold opening, the valves 18 and 21 are closed and the cooling liquid is again placed under a negative pressure. This negative pressure increases the tendency of the cooling liquid to boil and turn into a gas and thus the liquid in the porous insert tends to boil requiring heat for vaporization. This change of state greatly enhances the quantity of heat absorbed by the cooling fluid. The negative pressure is maintained on the cooling liquid after the dies are opened and the plastic article removed from the cavity. Air will accordingly be sucked through the porous insert tending to evaporate any cooling liquid remaining in the porous insert and further extracting heat from the mold dies. Additionally, the passage of air assures that there will not be any cooling liquid on the surface 15a when plastic material is initially injected in the next cycle.

While there has been shown a porous insert 15 only covering a portion of the core 14, it is within the scope of the present invention to substantially enlarge the portion of the mold cavity that is defined by porous material, as for example perhaps almost completely forming the core 14 entirely of porous material either as one complete insert or as a plurality of individual inserts. The extent of the mold cavity which is formed of porous metal will of course be limited by the requirement that the finished article have a smooth surface rather than a textured type surface that tends to be caused by the porous metal.

Figures 2, 3:
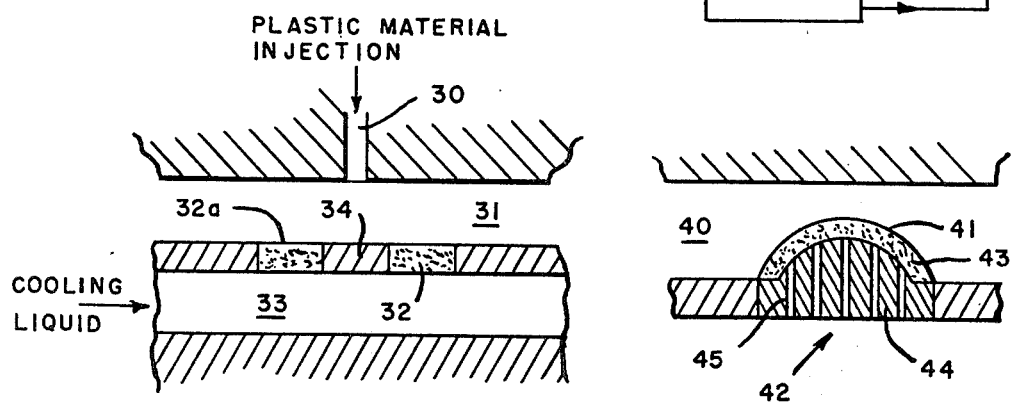
FIG. 2 is a partial sectional view of one relative placement of the porous insert in a mold cavity.
FIG. 3 is a sectional view of a different form of a porous insert in a partial mold cavity.

As the portion of the mold cavity formed by the porous metal extracts heat from the plastic material faster than the typical mold die surfaces, it is contemplated that rather than have the plastic insert be remotely located from the sprue entrance to the mold cavity, that the insert be placed somewhat directly opposite the sprue. As shown in FIG. 2, the injection of plastic material may occur through a sprue 30 into a mold cavity 31 while a porous insert 32 is positioned somewhat opposite thereto in communication with a cooling passageway 33. Accordingly, as the plastic material is injected into the mold cavity and a skin is formed on the surface 32a of the insert, the further injection of plastic material will engage the cool skin and tend to extract heat therefrom as the material flows to fill the remainder of the cavity.

It should be noted that the plastic material exiting from the sprue has a high velocity and it is preferred that it impinge directly on a portion 34 of the mold die rather than on the insert 32. Thus the insert 32 may be annular for example as shown or a plurality of individual inserts surrounding the die portion 34 so that the plastic material after impinging on the portion 34, then flows over the porous insert to fill the cavity.

In the embodiments shown in FIGS. 1 and 2, the surface 15a of the porous insert has been shown as being flat as the cavity has the desired shape thereat. If, as shown in FIG. 3, a cavity 40 requires a contoured hump for example, the mold forming surface 41 of an insert 42 may be so shaped. Further, the insert 42 may be formed with a layer 43 of porous metal material that is attached to and supported by a stronger metal part 44, the latter having perforations 45 for permitting flow of fluid therethrough to the insert.

While the above description of the operation of the system merely refers to operation of the valves 18–21 inclusive, it is contemplated that a timer 51 may be connected to the valves for automatically operating them. Thus for example the shift from negative to positive coolant pressure may be set to occur a determined time after the start of the injection of plastic material with the time being determined typically by trial and error.

While the positive pressure system applies a positive pressure of perhaps 5 psi against the surface 15b of the plug, the value of positive pressure may vary with it preferably being as high as conveniently possible but limited by the tendency of the coolant to migrate from the porous insert surface to adjacent surfaces of the mold where it could produce undesirable articles.

If desired, a shift from a negative pressure to a quick burst of positive pressure coolant may be obtained by momentary closure of the outlet valve 20. Though the system 23 has a pressure regulator for controlling the coolant inlet pressure, typically commercially available regulators generally do not completely eliminate pressure overshoot. If unsufficient overshoot is not available, a bypass connected to a high pressure source may be employed together with a valve that is operated simultaneously with the closure of the outlet valve. The high pressure burst enhances flow of cooling liquid into the insert.

In some instances, it may be desirable when shifting to the negative pressure system 23, to initially open the outlet valve 20 and then momentarily delay the opening of the inlet valve 19. This applies a short duration of excess negative pressure within the passageway. One instance in which such excess negative pressure without cooling liquid flow has been found helpful is when the article is a deep drawn part and is stripped of its core such as the core 14. The stripping develops a vacuum on the surface 15a which would draw liquid coolant through the insert 14 and into the mold cavity. By controlling the duration of excess negative pressure the quantity of withdrawn coolant may be basically controlled. It is to be understood however that in some situations, the withdrawing of some liquid coolant by the article being ejected may be helpful, if the withdrawn coolant remains on the article and is evaporated by the heat in the article to thereby aid in cooling the article after removal from the mold dies.

An excess negative pressure has also been found helpful in enhancing the initial vaporization of the cooling liquid.

As shown in FIG. 3, the insert 42 may be provided with a rigid metal backing that is perforated so that the porous metal may be held on the order of 0.045 thick but still have rigidity. It has been found preferable not to have the porous insert be too thick as it decreases the conduction of heat between its two surfaces such as from the surface 15a to the surface 15b. While one thickness has been indicated, it is prefered to use as thin a layer of porous metal as possible because smaller size pores may be employed to prevent plastic penetration while still enabling relative free passage of fluid through the insert.

Though there has been shown two independent coolant flow systems, it will be understood that each need not be completely independent but may have some common parts, as for example a pump. Alternatively, the positive pressure system may be simply a connection to a source of city water.

Figure 4:
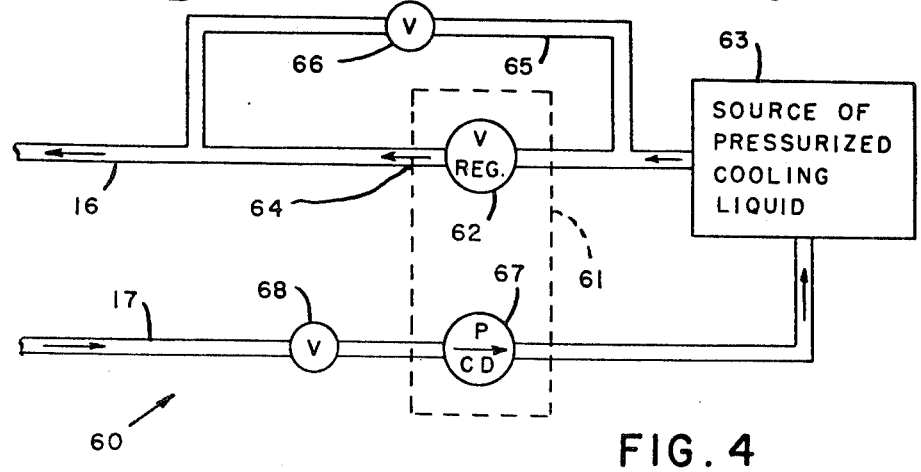
FIG. 4 is a schematic illustration of a further embodiment of a system for supplying cooling liquid at various pressures to the mold dies.

Shown in FIG. 4 is an alternate embodiment of a system 60 for supplying cooling liquid at different pressures to the input pipe 16 and the output pipe 17. Enclosed within a block 61 is a negative pressure system which is preferably of the type disclosed in my above-noted patent application, Ser. No. 733,812 which includes a constant pressure regulator 62 having an input connected to a source 63 of pressurized cooling liquid which may for example have a positive pressure of perhaps 40 psi. The regulator 62 is set to produce an output at essentially constant zero atmospheric pressure through an outlet 64 to the input pipe 16. A pipe 65 including a valve 66 is connected to bypass the regulator 22.

The output line 17 is connected to the input of a constant displacement pump 67 that is included in the block 61 through a valve 68.

In the operation of the system 60, with valve 68 open and valve 66 closed, the system functions as disclosed in my above-noted application. With valves 66 and 68 both open, cooling liquid at a positive pressure is applied to the inlet pipe 16. If the valve 68 is then momentarily closed, the liquid pressure can be increased to that approaching the source 63 pressure to provide the momentary high positive pressure. If the valve 66 is momentarily closed with the valve 68 opened, the system will provide a high negative pressure in the pipes 16 and 17.

If desired, the valve 68 may be eliminated and the effect of closure thereof, be produced by deenergizing the pump 67. Further, the valves may be automatically operated as by the timer 51.

It will accordingly be understood that there has been disclosed a method and system for enhancing the transfer of heat from an injection molded plastic article to a coolant, thereby decreasing the cycle time required to produce the article. A porous metal insert has one surface forming a portion of the mold cavity and its opposite surface communicate with a coolant passage. By changing the pressure of the liquid coolant in the cooling passageway, the extraction of heat is enhanced by both or either having the coolant actually engage the plastic material and by increasing the ability of the coolant to extract heat by boiling to absorb its heat of vaporization.

Variations and modifications may be made within the scope of the claims and portions of the improvements may be used without others.

I claim:

1. Apparatus for cooling a plastic article that is formed by injection of plastic material into a mold formed by mold dies comprising means forming a cooling passgeway in the mold dies at least adjacent a portion of the cavity, means forming a fluid permeable porous conduit between the cooling passageway and a portion of the mold cavity, a source of cooling liquid, means for providing less than atmospheric pressure in the passageway adjacent said porous conduit, means for forcing said cooling liquid through the passageway to have the liquid at least adjacent the porous conduit be at a greater than atmospheric pressure, and means for alternatively connecting said means for providing less than atmospheric pressure and said forcing means to said passageway.

2. Apparatus as defined in claim 1 in which the means forming the cooling passageway has an inlet and an outlet and in which there is a valve means at the inlet and a valve means at the outlet.

3. Apparatus as defined in claim 1 in which the source of cooling liquid is at a greater than atmospheric pressure and in which the means for forcing cooling liquid at a greater than atmospheric pressure includes a bypass connection to the source having a valve.

4. Apparatus as defined in claim 1 in which the source of cooling liquid is at a greater than atmospheric pressure and in which the means for supplying cooling liquid at a less than atmospheric pressure includes a pressure regulating valve connected to the source and a pump.

* * * * *